United States Patent
Neuhaus et al.

(10) Patent No.: US 6,289,921 B1
(45) Date of Patent: Sep. 18, 2001

(54) HYDRAULIC VALVE, ESPECIALLY FOR CONTROLLING A CAMSHAFT MOVEMENT IN A MOTOR VEHICLE

(75) Inventors: Rolf Neuhaus, Lohr; Jürgen Rettinger; Robert Schlöder, both of Gemünden, all of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/446,840

(22) PCT Filed: Apr. 29, 1998

(86) PCT No.: PCT/EP98/02525

§ 371 Date: Apr. 24, 2000

§ 102(e) Date: Apr. 24, 2000

(87) PCT Pub. No.: WO99/00602

PCT Pub. Date: Jan. 7, 1999

(30) Foreign Application Priority Data

Jun. 26, 1997 (DE) .............................................. 197 27 180

(51) Int. Cl.[7] .................................................. F16K 27/04
(52) U.S. Cl. .................................. 137/454.5; 137/625.65; 137/625.68
(58) Field of Search ........................ 137/454.5, 625.65, 137/625.68

(56) References Cited

U.S. PATENT DOCUMENTS

| | | | |
|---|---|---|---|
| 4,979,542 | * 12/1990 | Mesenich | 137/625.65 |
| 5,191,827 | * 3/1993 | Kervagoret | 137/625.65 X |
| 5,259,414 | * 11/1993 | Suzuki | 137/625.65 |
| 5,377,720 | * 1/1995 | Stobbs et al. | 137/625.65 |
| 5,487,410 | * 1/1996 | Niethammer | 137/625.65 |
| 5,577,534 | * 11/1996 | Ward | 137/625.65 X |
| 5,592,972 | * 1/1997 | Niethammer | 137/625.65 |
| 5,615,860 | * 4/1997 | Brehm et al. | 137/625.65 X |
| 5,853,028 | * 12/1998 | Ness et al. | 137/625.65 |
| 5,878,782 | * 3/1999 | Nakajima | 137/625.68 X |
| 5,911,400 | * 6/1999 | Niethammer et al. | 251/129.08 |

FOREIGN PATENT DOCUMENTS

| | | | |
|---|---|---|---|
| 39 14 094 | * 10/1990 | (DE) . | |
| 44 23 629 | * 1/1996 | (DE) | 137/625.65 |

\* cited by examiner

*Primary Examiner*—Gerald A. Michalsky
(74) *Attorney, Agent, or Firm*—R.W. Becker & Associates; R. W. Becker

(57) ABSTRACT

A hydraulic valve, especially for controlling a camshaft movement in a motor vehicle, is provided. A valve bushing is insertable from an end face thereof into the receiving bore of a housing. The valve bushing has an axially extending control bore into which a disk is pressed with press fit from the end face of the valve bushing. The valve bushing, on an exterior surface thereof and starting from the end face, is provided with a turned groove that is disposed remote from a pressure medium flow.

9 Claims, 1 Drawing Sheet

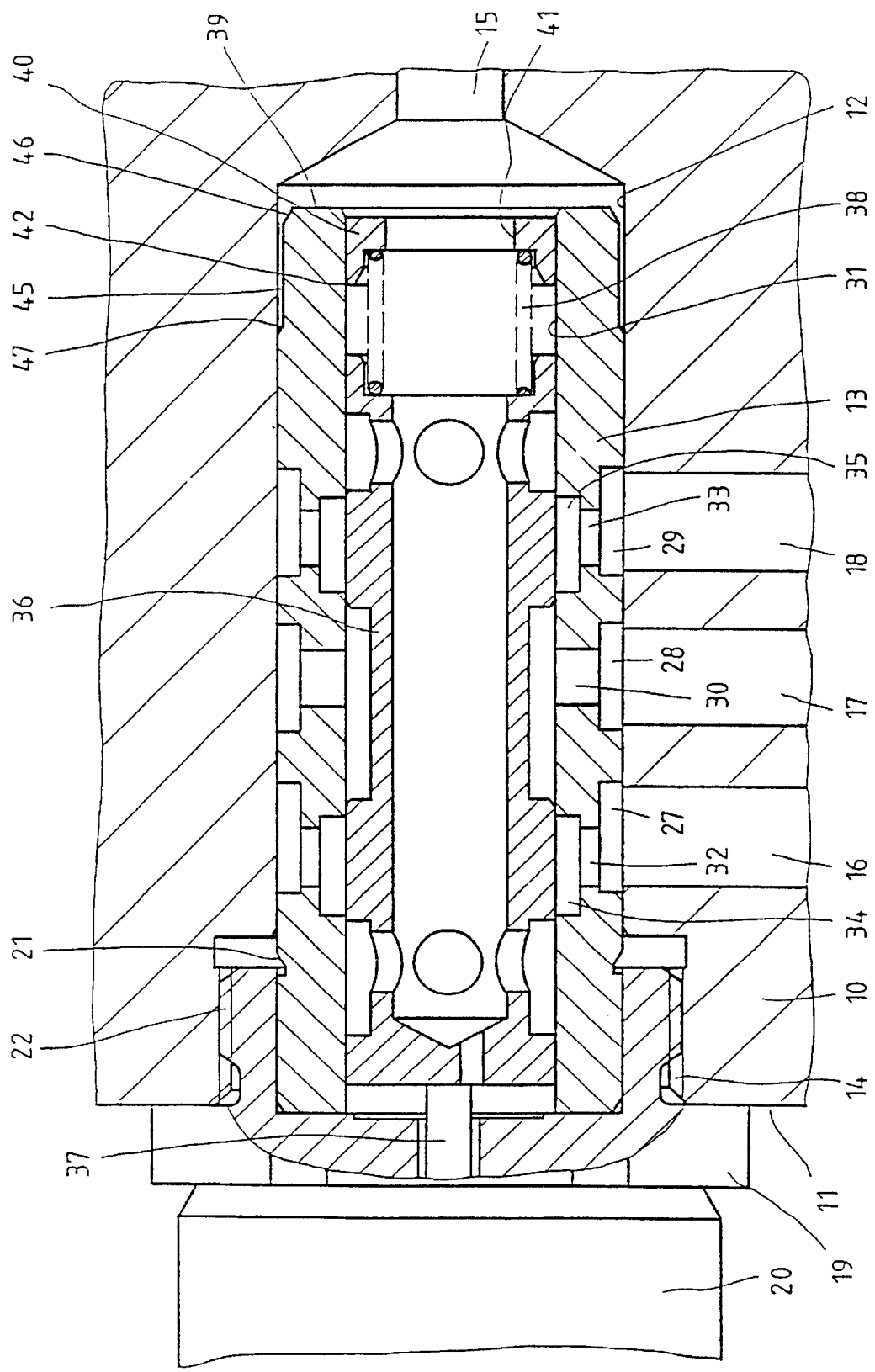

HYDRAULIC VALVE, ESPECIALLY FOR CONTROLLING A CAMSHAFT MOVEMENT IN A MOTOR VEHICLE

BACKGROUND OF THE INVENTION

The invention is based on a hydraulic valve that in particular is used for controlling a camshaft movement in a motor vehicle and that includes a valve bushing that is insertable from an end face thereof into the receiving bore of a housing and that has an axially extending control bore into which a disk is inserted from the end face.

Known from DE 41 31 384 C2 is a hydraulic valve that comprises a valve bushing, one face of which is insertable into a receiving bore of a housing. The housing can be, e.g., the housing of an internal combustion engine. Disposed in an axial control bore of the valve bushing is a piston valve with which the pressure medium paths between a supply channel, a discharge channel, and a consumer channel are controllable. One of these channels can branch off axially from the receiving bore of the housing and be disposed with the mouth of the control bore at the face of the valve bushing in the same flow path. In the valve in accordance with DE 41 31 384 C2, the valve bushing is assembled with an electromagnet, by means of which a piston valve is displaceable in the control bore of the valve bushing closer toward the face of the valve bushing against the force of a helical compression spring. The helical compression spring is supported on an internal shoulder of the valve bushing and on a retaining ring that is attached to the piston valve in the vicinity of the end of the piston valve that faces the electromagnet.

A hydraulic valve with a similar structure is known from DE 44 22 742 A1. In this case, a piston valve is displaceable in the control bore of a valve component that is not embodied as a valve bushing to be used in a housing, but rather is itself a housing with external connections. The helical compression spring, against the force of which the piston valve is movable by an electromagnet, is supported between the piston valve and a disk that is pressed into the control bore at a side of the housing that faces away from the electromagnet. In this case it is possible to adjust the spring resistance in that the disk is pressed into the control bore for more or less of the path.

In the valve in accordance with DE 44 22 742 A1, which is produced in series for the automobile industry, the valve housing, piston valve, and support disk for the helical compression spring are manufactured from aluminum or an aluminum alloy.

A hydraulic valve with the features initially described is known from EP 0667 459 A1. In the hydraulic valve illustrated therein, the disk is screwed into the valve bushing, wherein nothing further is required to adjust the force of the helical compression spring fixed between the disk and the piston valve. However, providing the thread to the disk and to the valve bushing as well as screwing in the disk is complex and expensive.

The object of the invention is to provide a hydraulic valve having the initally described features that in terms of manufacture of individual parts and in terms of assembly is more cost-effective.

SUMMARY OF THE INVENTION

This object is achieved in accordance with the invention in that the hydraulic valve is characterized primarily in that the disk is pressed with press fit into the control bore, and in that the valve bushing, starting from the end face, is provided on an exterior surface thereof with a turned groove that is disposed remote from a pressure medium flow. This means that the disk is pressed into the control bore with press fit so that neither it nor the valve bushing must be provided a thread and they are therefore relatively simple to produce. In addition, the valve bushing, starting from the end face, is provided on its exterior a turned groove located remote from a pressure medium flow. This makes it possible to insert the valve bushing with a vacuum into the receiving bore even though the passage between the valve bushing and the receiving bore of the housing is very narrow due to the sealing necessary between the various pressure medium channels. That is, due to the turned groove, a slight expansion in the bushing in the region of the disk that has been pressed in does not make the valve bushing too large.

In a hydraulic valve already known from DE 39 14 094 A1 a disk with press fit is inserted into a valve bushing and the valve bushing has an external turned groove in the region of the disk. However, the disk comprises plastic, so that one cannot expect the valve bushing, which is obviously produced from a metal material, to expand when the disk is pressed in. In addition, the turned groove is disposed in a pressure medium path that encompasses axial passages in the disk, the region of the receiving bore anterior to the valve bushing, the turned groove, and a channel leading off radially from the receiving bore in the region of the turned groove. Pressing the disk in thus has nothing to do with the external turned groove on the valve bushing.

In contrast, in the hydraulic valve in accordance with the invention, there is a turned groove on the valve bushing that has nothing to do with the pressure medium flow.

Advantageous embodiments of a hydraulic valve in accordance with the invention can be seen from the following.

For instance, the valve bushing and the disk are made of materials that are at least substantially the same in terms of their coefficients of expansion. This ensures that the press fit between the disk and the valve bushing is maintained in a large temperature range. Preferably the valve bushing and the disk are each made of aluminum or an aluminum alloy.

It is advantageous if the distance from the end of the turned groove to the face of the valve bushing is greater than the distance from such face of that end of the press segment remote from the face whereby the press segment is between the valve bushing and the disk. Preferably the ratio of these distances is between 1.5 and 2.0.

The depth of the turned groove in the radial direction is preferably less than 10% of the wall thickness of the valve bushing. The depth of the turned groove is substantially less than the depth of an annular slot on the valve bushing that opens outward and that is situated in a pressure medium flow path.

BRIEF DESCRIPTION OF THE DRAWING

The drawing illustrates one exemplary embodiment of a hydraulic valve in accordance with the invention. The invention will now be explained in more detail using this drawing.

DESCRIPTION OF PREFERRED EMBODIMENTS

In the drawing part of a metal housing 10 can be seen that is, e.g., part of the engine block of a motor vehicle. Situated in the housing 10 starting at an assembly or mounting surface 11 is a receiving bore 12 for a valve sleeve or bushing 13. The latter can be considered a pipe-shaped component that has a constant exterior and interior diameter along its entire length and that is interrupted by various turned grooves. Over most of the length of the receiving bore 12 its diameter matches the exterior diameter of the valve bushing 13 such that the valve bushing can be inserted into the receiving bore with a vacuum. Around the assembly surface 11, the receiving bore 12 has a segment with an enlarged diameter that is provided an internal thread 14. A pressure medium or hydraulic fluid channel 15 leads off axially from the base of the receiving bore 12. Three additional pressure medium channels 16, 17, and 18, open radially into the receiving bore 12.

The valve bushing 13 is inserted into a blind hole of a pole core 19 of an electromagnet 20 and is held therein by pressing material of the pole core into a turned groove 21. The pole core 19 is provided an axial extension with an external thread 22 and is thus screwed into the internal thread 14 of the receiving bore 12.

The pressure medium channels 16, 17, and 18 of the housing 10 are allocated outwardly open annular slots 27, 28, and 29 of the valve bushing 13. A plurality of radial bores 30 leads from the center annular slot 28 into the continuous internal bore of the valve bushing 13, this internal bore acting as control bore 31. The annular slots 27 and 29 are connected via radial bores 32 and 33 to annular slots 34 and 35 that are arranged axially displaced relative thereto [relative to annular slots 27 and 29] and that open inward to the control bore 31.

Axially displaceable in the control bore 31 is a piston valve or control piston 36 with which the pressure medium paths between the channels 15, 16, 17, and 18 are controllable. The piston valve 36 is actuatable on a face facing the electromagnet 20 by a push rod or tappet 37 of the electromagnet and can be displaced by the electromagnet against the force of a helical compression spring 38 in the direction of the base of the receiving bore 12 and closer to the end face 39 of the valve bushing 13 facing this base. The helical compression spring is inserted between the piston valve 36 and a disk 40 that is pressed from the side of the face 39 with press fit into the control bore 31 of the valve bushing 13. In order to make possible unobstructed pressure medium flow between the control bore 31 and the pressure medium channel 15, the disk 40 is provided with a central passage 41. The press segment between the disk 40 and the valve bushing 13 is slightly smaller than the axial recess of the disk 40 since the latter has an entry incline 42.

The valve bushing 13 and the disk 40 are made of the same aluminum alloy, therefore have the same coefficients of thermal expansion, and thus remain securely joined together in a large range of temperatures.

When the disk 40 is pressed into the control bore 31, the valve bushing 13 expands slightly. So that this expansion when the valve bushing 13 is introduced into the receiving bore 12 does not lead to problems, the valve bushing 13 has externally at its face 39 a turned groove 45, the depth of which is radially substantially less than the depth of the annular slots 27, 28, and 29. In a valve in which the external diameter of the valve bushing is 20 mm and the internal diameter is 12 mm, the turned groove is, e.g., 0.5 mm deep and is thus only about 6% of the wall thickness of the valve bushing 13 as determined from the external and internal diameters. The turned groove 45 extends axially from the face 39 of the valve bushing 13 over the press segment between the disk 40 and the valve bushing 13. In the present example, the end of the turned groove 45 is about 1.75 times as far from the face 39 of the valve bushing 13 as the end of the press element that is between the disk 40 and the valve bushing 13 and that is located at the transition to the entry incline 42 of the disk 40. Such a length of the turned groove 45 effectively prevents interference in the valve bushing 13 caused by pressing the disk 40 in. On the other hand, the sealing length between the annular slot 29 and the turned groove 45 on the exterior of the valve bushing 13 is still long enough to prevent much leakage of pressure medium between the channels 15 and 18.

Located at the two ends of the turned groove 45 are insertion inclines 46 and 47 that incline in the same direction and that facilitate inserting the valve bushing 13 into the receiving bore 12.

The specification incorporates by reference the disclosure of German priority document 197 27180.4 of Jun. 26, 1997 and European priority document PCT/EP98/02525 filed Apr. 9, 1998.

The present invention is, of course, in no way restricted to the specific disclosure of the specification and drawings, but also encompasses any modifications within the scope of the appended claims.

What is claimed is:

1. A hydraulic valve for controlling a camshaft movement in motor vehicle, disposed in a housing having a receiving bore, said valve comprising:

a valve bushing that is insertable from an end face thereof into said receiving bore of said housing, wherein said valve bushing has an axially extending control bore into which a disk is pressed with press fit from said end face, and wherein said valve bushing is provided with a first turned groove in an area of the press-fitting of the disk in said control bore, said first turned groove disposed remote from a pressure medium flow, wherein the valve bushing in the area of said first turned groove has a smaller outer diameter than said receiving bore of the housing, and wherein a second turned groove is formed between an outer mantel of the valve bushing in the area of the first turned groove and a wall of the receiving bore, wherein said second turned groove has a width such that an expansion of the valve bushing upon press-fitting of the disk is smaller than the width of the second turned groove.

2. A hydraulic valve according to claim 1, wherein said valve bushing and said disk are made of materials that are at least substantially the same in terms of their coefficients of expansion.

3. A hydraulic valve according to claim 2, wherein said valve bushing and said disk are each made of a metallic material.

4. A hydraulic valve according to claim 3, wherein said valve bushing and said disk are each made of aluminum or an aluminum alloy.

5. A hydraulic valve according to claim 1, wherein a distance of an axially inner end of said turned groove from said end face of said valve bushing is greater than a distance from said end face of that end of a press segment that is remote from said end face, wherein said press segment is provided between said valve bushing and said disk.

6. A hydraulic valve according to claim 5, wherein the ratio of said distances is between 1.5 and 2.0.

7. A hydraulic valve according to claim 6, wherein the ratio of said distances is between 1.7 and 1.8.

8. A hydraulic valve according to claim 1, wherein said turned groove has a depth in a radial direction that is less than 10% of a thickness of said valve bushing.

9. A hydraulic valve according to claim 1, wherein said valve bushing is provided with at least one outwardly open annular slot that is disposed in a pressure medium flow path, and wherein a depth of said turned groove in a radial direction is substantially less than a depth of said at least one annular slot.

* * * * *